(12) United States Patent
Kawase et al.

(10) Patent No.: US 11,394,041 B2
(45) Date of Patent: Jul. 19, 2022

(54) HIGH PRESSURE TANK RESIDUAL PRESSURE DETERMINATION SYSTEM, HIGH PRESSURE TANK RESIDUAL PRESSURE DETERMINATION METHOD, AND FUEL CELL VEHICLE

(71) Applicant: HONDA MOTOR CO., LTD., Tokyo (JP)

(72) Inventors: Satoru Kawase, Wako (JP); Kazuyuki Kadowaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 352 days.

(21) Appl. No.: 16/784,274

(22) Filed: Feb. 7, 2020

(65) Prior Publication Data

US 2020/0259195 A1    Aug. 13, 2020

(30) Foreign Application Priority Data

Feb. 12, 2019    (JP) .............................. JP2019-022470

(51) Int. Cl.
*F16K 31/02*    (2006.01)
*H01M 8/0438*    (2016.01)
(Continued)

(52) U.S. Cl.
CPC ..... *H01M 8/04425* (2013.01); *G01L 19/0092* (2013.01); *G05D 16/2013* (2013.01);
(Continued)

(58) Field of Classification Search
CPC ......... H01M 8/04425; H01M 8/04201; H01M 8/04373; H01M 8/04753; H01M 2250/20;
(Continued)

(56) References Cited

U.S. PATENT DOCUMENTS 7,892,688 B2    2/2011    Takaku et al.
8,308,347 B2    11/2012    Kanie
(Continued)

FOREIGN PATENT DOCUMENTS

CN    1877892    12/2006
CN    201032051    3/2008
(Continued)

OTHER PUBLICATIONS

Chinese Office Action for Chinese Patent Application No. 202010088271.2 dated May 13, 2021.

*Primary Examiner* — Minh Q Le
(74) *Attorney, Agent, or Firm* — Amin, Turocy & Watson, LLP

(57) ABSTRACT

A computation unit of a residual pressure determination system obtains a corresponding usage limit threshold value corresponding to a measured temperature value of a tank temperature, from a usage limit threshold value line calculated using at least one of a required minimum residual pressure line and an isopycnic line. When having determined that a measured internal pressure value has decreased to the corresponding usage limit threshold value, a determination unit stops release of hydrogen gas from a high pressure tank. A tank internal pressure indicated by the usage limit threshold value line within an allowable temperature range becomes greater than or equal to the tank internal pressure indicated by the isopycnic line or that indicated by a tangent line, and at least a portion of the tank internal pressure indicated by the usage limit threshold value line within the allowable temperature range becomes lower as the tank temperature becomes lower.

17 Claims, 7 Drawing Sheets

(51) Int. Cl.
*G05D 16/20* (2006.01)
*G01L 19/00* (2006.01)
*H01M 8/04082* (2016.01)
*H01M 8/04746* (2016.01)
*H01M 8/0432* (2016.01)
*F17C 7/00* (2006.01)

(52) U.S. Cl.
CPC ... *H01M 8/04201* (2013.01); *H01M 8/04373* (2013.01); *H01M 8/04753* (2013.01); *F17C 7/00* (2013.01); *F17C 2201/0109* (2013.01); *F17C 2201/056* (2013.01); *F17C 2201/058* (2013.01); *F17C 2203/0604* (2013.01); *F17C 2203/0658* (2013.01); *F17C 2203/0663* (2013.01); *F17C 2205/0326* (2013.01); *F17C 2221/012* (2013.01); *H01M 2250/20* (2013.01)

(58) Field of Classification Search
CPC ... G01L 19/0092; G05D 16/2013; F17C 7/00; F17C 2201/0109; F17C 2201/056; F17C 2201/058; F17C 2203/0604; F17C 2203/0658; F17C 2203/0663; F17C 2205/0326; F17C 2221/012
USPC ..................................................... 137/487.5
See application file for complete search history.

(56) References Cited

U.S. PATENT DOCUMENTS

| | | | | |
|---|---|---|---|---|
| 9,109,750 | B2* | 8/2015 | Okawachi | F17C 13/026 |
| 10,753,538 | B2* | 8/2020 | Hioki | B29C 61/04 |
| 2003/0049501 | A1* | 3/2003 | Fujita | H01M 8/065 |
| | | | | 429/513 |
| 2005/0166992 | A1* | 8/2005 | Yokota | F17C 11/005 |
| | | | | 141/51 |
| 2007/0186982 | A1* | 8/2007 | Cohen | F17C 13/025 |
| | | | | 137/487.5 |
| 2009/0291342 | A1* | 11/2009 | Tezuka | H01M 8/04231 |
| | | | | 429/441 |
| 2010/0068578 | A1* | 3/2010 | Katano | H01M 8/04089 |
| | | | | 429/437 |
| 2010/0075200 | A1* | 3/2010 | Hatta | B29C 45/1615 |
| | | | | 220/586 |
| 2010/0253529 | A1* | 10/2010 | Umayahara | G01G 17/04 |
| | | | | 702/50 |
| 2010/0255397 | A1* | 10/2010 | Ishikawa | H01M 8/04753 |
| | | | | 429/444 |
| 2011/0210131 | A1* | 9/2011 | Shimizu | F17C 1/06 |
| | | | | 220/694 |
| 2013/0052557 | A1* | 2/2013 | Okawachi | H01M 8/04388 |
| | | | | 429/444 |
| 2018/0006319 | A1* | 1/2018 | Asai | H01M 8/04201 |
| 2018/0112828 | A1* | 4/2018 | Bourgeois | F17C 13/023 |
| 2018/0138528 | A1* | 5/2018 | Komiya | H01M 8/04201 |
| 2018/0294497 | A1* | 10/2018 | Asai | H01M 8/04798 |
| 2020/0036021 | A1* | 1/2020 | Takahashi | H01M 8/04164 |
| 2020/0119386 | A1* | 4/2020 | Tomura | H01M 8/04089 |
| 2020/0411886 | A1* | 12/2020 | Fukunaga | B60L 3/0053 |
| 2021/0221075 | A1* | 7/2021 | Hatta | B29C 70/54 |

FOREIGN PATENT DOCUMENTS

CN 101617206 12/2009
JP 2003-172654 6/2003

* cited by examiner

ND FUEL CELL VEHICLE

HIGH PRESSURE TANK RESIDUAL PRESSURE DETERMINATION SYSTEM, HIGH PRESSURE TANK RESIDUAL PRESSURE DETERMINATION METHOD, AND FUEL CELL VEHICLE

CROSS-REFERENCE TO RELATED APPLICATION

This application is based upon and claims the benefit of priority from Japanese Patent Application No. 2019-022470 filed on Feb. 12, 2019, the contents of which are incorporated herein by reference.

BACKGROUND OF THE INVENTION

Field of the Invention

The present invention relates to a residual pressure determination system for a high pressure tank having a resin liner capable of storing a gas therein and a reinforced layer that covers an outer surface of the liner, a residual pressure determination method for the high pressure tank, and a fuel cell vehicle.

Description of the Related Art

For example, as disclosed in Japanese Laid-Open Patent Publication No. 2003-172654, a pressure (tank internal pressure) of a gas stored in a high pressure tank changes in accordance with a temperature (tank temperature) of a gas inside the high pressure tank, even if a density of the gas inside the high pressure tank is kept the same.

Incidentally, in a high pressure tank having a resin liner and a reinforced layer that covers an outer surface of the liner, gas that is stored inside the liner may penetrate through the liner, and enter into an interval (hereinafter also referred to as a covered portion) between the outer surface of the liner and the reinforced layer. When the gas stored in the high pressure tank is released, the tank internal pressure (the pressure of the gas inside the liner) decreases. At this time, when the tank internal pressure becomes lower than the pressure of the gas that has entered into the covered portion, there is a concern that the liner and the reinforced layer may peel off or separate from one another, and the liner may undergo buckling or the like and protrude toward the interior thereof.

SUMMARY OF THE INVENTION

In this type of high pressure tank, in accordance with specifications thereof and the like, a required minimum value of the tank internal pressure that is capable of avoiding the above-described buckling or the like is indicated by a required minimum residual pressure line, which is a function of a predetermined tank temperature. For this reason, the high pressure tank is preferably used in a state in which a measured value (measured internal pressure value) of the tank internal pressure is monitored by a high pressure tank residual pressure determination system, so as not to fall below the tank internal pressure indicated by the required minimum residual pressure line.

In such a residual pressure determination system, in order to stop further release of the gas from the high pressure tank, a usage limit threshold value which is greater than or equal to the tank internal pressure indicated by the required minimum residual pressure line is set as a tank internal pressure threshold value. In addition, the high pressure tank is used while measuring the tank internal pressure, and in the case it is determined that the measured internal pressure value has decreased to the usage limit threshold value, release of the gas is stopped by closing a main stop valve that opens and closes a supply/discharge flow passage of the high pressure tank. Consequently, when the high pressure tank is used, it is possible to avoid a situation in which the measured internal pressure value falls below the tank internal pressure indicated by the required minimum residual pressure line.

As described above, even in the case that the gas density inside the high pressure tank is maintained, the tank internal pressure changes in accordance with changes in the tank temperature. For this reason, in the high pressure tank, at a time when the main stop valve is closed and usage is stopped with the gas density being maintained in the manner described above, even in the case that the tank temperature changes significantly in accordance with seasonal changes or the like, it is necessary to set the usage limit threshold value in a manner so that the actual tank internal pressure does not fall below the tank internal pressure indicated by the required minimum residual pressure line.

Thus, at any temperature within an allowable temperature range that is allowable (guaranteed) as a usage environment for the high pressure tank, it may be considered to provide a sufficient margin so that the tank internal pressure indicated by the required minimum residual pressure line does not fall below the tank internal pressure, together with setting the tank internal pressure, which remains constant regardless of the tank temperature, on a usage limit threshold value line.

However, when the usage limit threshold value line is set in the manner described above, at a tank temperature at which the tank internal pressure indicated by the required minimum residual pressure line becomes relatively low, there is a concern that the tank internal pressure indicated by the usage limit threshold value line may become higher than necessary in relation to the tank internal pressure indicated by the required minimum residual pressure line. As a result, release of the gas is stopped while the gas having a tank internal pressure significantly in excess of the tank internal pressure indicated by the required minimum residual pressure line remains within the high pressure tank, and it becomes difficult for the gas that is stored in the high pressure tank to be used effectively.

The present invention has been devised in order to solve the aforementioned problems, and has the object of providing a high pressure tank residual pressure determination system, a high pressure tank residual pressure determination method, and a fuel cell vehicle, in which, even if the tank temperature changes within an allowable temperature range when usage of the high pressure tank is stopped, the actual tank internal pressure can be prevented from falling below the tank internal pressure indicated by the required minimum residual pressure line, and the gas that is stored in the high pressure tank can be used effectively.

One aspect of the present invention is characterized by a residual pressure determination system for a high pressure tank having a resin liner configured to store a gas therein, and a reinforced layer covering an outer surface of the liner, the residual pressure determination system for the high pressure tank comprising an internal pressure measurement unit configured to measure a tank internal pressure, which is a pressure of the gas inside the liner, to thereby obtain a measured internal pressure value, a temperature measurement unit configured to measure a tank temperature, which is a temperature of the gas inside the liner, to thereby obtain a measured temperature value, a storage unit configured to store a usage limit threshold value line which is a function of the tank temperature and is indicative of a usage limit threshold value of the tank internal pressure, the usage limit threshold value line being calculated using at least one of a required minimum residual pressure line which is a function of the tank temperature and is indicative of a required minimum value of the tank internal pressure, and an isopycnic line indicative of a relationship between the tank temperature and the tank internal pressure in which a density of the gas is maintained with the tank internal pressure being on the required minimum residual pressure line at a minimum temperature within an allowable temperature range that is an allowable range of an environmental temperature at which the high pressure tank is used, a computation unit configured to determine, as a corresponding usage limit threshold value, the tank internal pressure on the usage limit threshold value line corresponding to the measured temperature value, and a determination unit configured to stop release of the gas from the high pressure tank when having determined that the measured internal pressure value has decreased to the corresponding usage limit threshold value, wherein the tank internal pressure indicated by the usage limit threshold value line within the allowable temperature range becomes greater than or equal to the tank internal pressure indicated by the isopycnic line, in a case that an entirety of the tank internal pressure indicated by the required minimum residual pressure line within the allowable temperature range is less than or equal to the tank internal pressure indicated by the isopycnic line, and becomes greater than or equal to the tank internal pressure indicated by a tangent line obtained by moving the isopycnic line to a side where the tank internal pressure becomes higher so that the isopycnic line contacts the required minimum residual pressure line, in a case that at least a portion of the tank internal pressure indicated by the required minimum residual pressure line within the allowable temperature range exceeds the tank internal pressure indicated by the isopycnic line, and at least a portion of the tank internal pressure indicated by the usage limit threshold value line within the allowable temperature range becomes lower as the tank temperature becomes lower.

Another aspect of the present invention is characterized by a residual pressure determination method for a high pressure tank having a resin liner configured to store a gas therein, and a reinforced layer covering an outer surface of the liner, the residual pressure determination method for the high pressure tank comprising a measurement step of measuring, by an internal pressure measurement unit, a tank internal pressure, which is a pressure of the gas inside the liner, to thereby obtain a measured internal pressure value, and measuring, by a temperature measurement unit, a tank temperature, which is a temperature of the gas inside the liner, to thereby obtain a measured temperature value, a calculation step of determining, as a corresponding usage limit threshold value, the tank internal pressure on a usage limit threshold value line corresponding to the measured temperature value, from the usage limit threshold value line which is a function of the tank temperature and is indicative of a usage limit threshold value of the tank internal pressure, the usage limit threshold value line being calculated using at least one of a required minimum residual pressure line which is a function of the tank temperature and is indicative of a required minimum value of the tank internal pressure, and an isopycnic line indicative of a relationship between the tank temperature and the tank internal pressure in which a density of the gas is maintained with the tank internal pressure being on the required minimum residual pressure line at a minimum temperature within an allowable temperature range that is an allowable range of an environmental temperature at which the high pressure tank is used, a determination step of determining whether or not the measured internal pressure value has decreased to the corresponding usage limit threshold value, and a stoppage step of stopping release of the gas from the high pressure tank in a case that it is determined, in the determination step, that the measured internal pressure value is less than or equal to the corresponding usage limit threshold value, wherein the tank internal pressure indicated by the usage limit threshold value line within the allowable temperature range becomes greater than or equal to the tank internal pressure indicated by the isopycnic line, in a case that an entirety of the tank internal pressure indicated by the required minimum residual pressure line within the allowable temperature range is less than or equal to the tank internal pressure indicated by the isopycnic line, and becomes greater than or equal to the tank internal pressure indicated by a tangent line obtained by moving the isopycnic line to a side where the tank internal pressure becomes higher so that the isopycnic line contacts the required minimum residual pressure line, in a case that at least a portion of the tank internal pressure indicated by the required minimum residual pressure line within the allowable temperature range exceeds the tank internal pressure indicated by the isopycnic line, and at least a portion of the tank internal pressure indicated by the usage limit threshold value line within the allowable temperature range becomes lower as the tank temperature becomes lower.

Another aspect of the present invention is characterized by a fuel cell vehicle comprising the above-described high pressure tank residual pressure determination system.

According to the present invention, the usage limit threshold value line, which is a function of the tank temperature and is indicative of the usage limit threshold value of the tank internal pressure, is calculated using at least one of the required minimum residual pressure line, and the isopycnic line of the gas for which the tank internal pressure at the minimum temperature is on the required minimum residual pressure line. From such a usage limit threshold value line, the tank internal pressure on the usage limit threshold value line corresponding to the measured temperature value of the high pressure tank is determined as the corresponding usage limit threshold value. In the case that it is determined that the measured internal pressure value has decreased to the corresponding usage limit threshold value, release of the gas from the high pressure tank is stopped.

The tank internal pressure indicated by the usage limit threshold value line within the allowable temperature range is greater than or equal to the tank internal pressure indicated by the isopycnic line, or is greater than or equal to the tank internal pressure indicated by the tangent line. Therefore, at the time that usage of the high pressure tank is stopped, even if the tank temperature changes within the allowable temperature range in a state in which the gas density inside the high pressure tank is maintained, it is possible to avoid a situation in which the actual tank internal pressure falls below the tank internal pressure indicated by the required minimum residual pressure line.

Further, at least a portion of the tank internal pressure indicated by the usage limit threshold value line within the allowable pressure range becomes lower as the tank temperature becomes lower. In this manner, the usage limit threshold value line is set, and the corresponding usage limit threshold value is calculated corresponding to each of respective measured temperature values. Consequently, for example, in comparison with a case in which the tank internal pressure indicated by the usage limit threshold value line is set to be constant regardless of the tank temperature, within the allowable temperature range, the tank internal pressure indicated by the corresponding usage limit threshold value can be prevented from becoming higher than necessary in relation to the tank internal pressure indicated by the required minimum residual pressure line. Therefore, it is possible to avoid a situation in which usage of the high pressure tank is stopped in a state in which gas having a tank internal pressure significantly in excess of the tank internal pressure indicated by the required minimum residual pressure line remains within the high pressure tank, and the gas that is stored in the high pressure tank can be used effectively.

As can be appreciated from the above, according to the present invention, even if the tank temperature changes within an allowable temperature range when usage of the high pressure tank is stopped, the actual tank internal pressure can be prevented from falling below the tank internal pressure indicated by the required minimum residual pressure line, and the gas that is stored in the high pressure tank can be used effectively.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Figure 1:
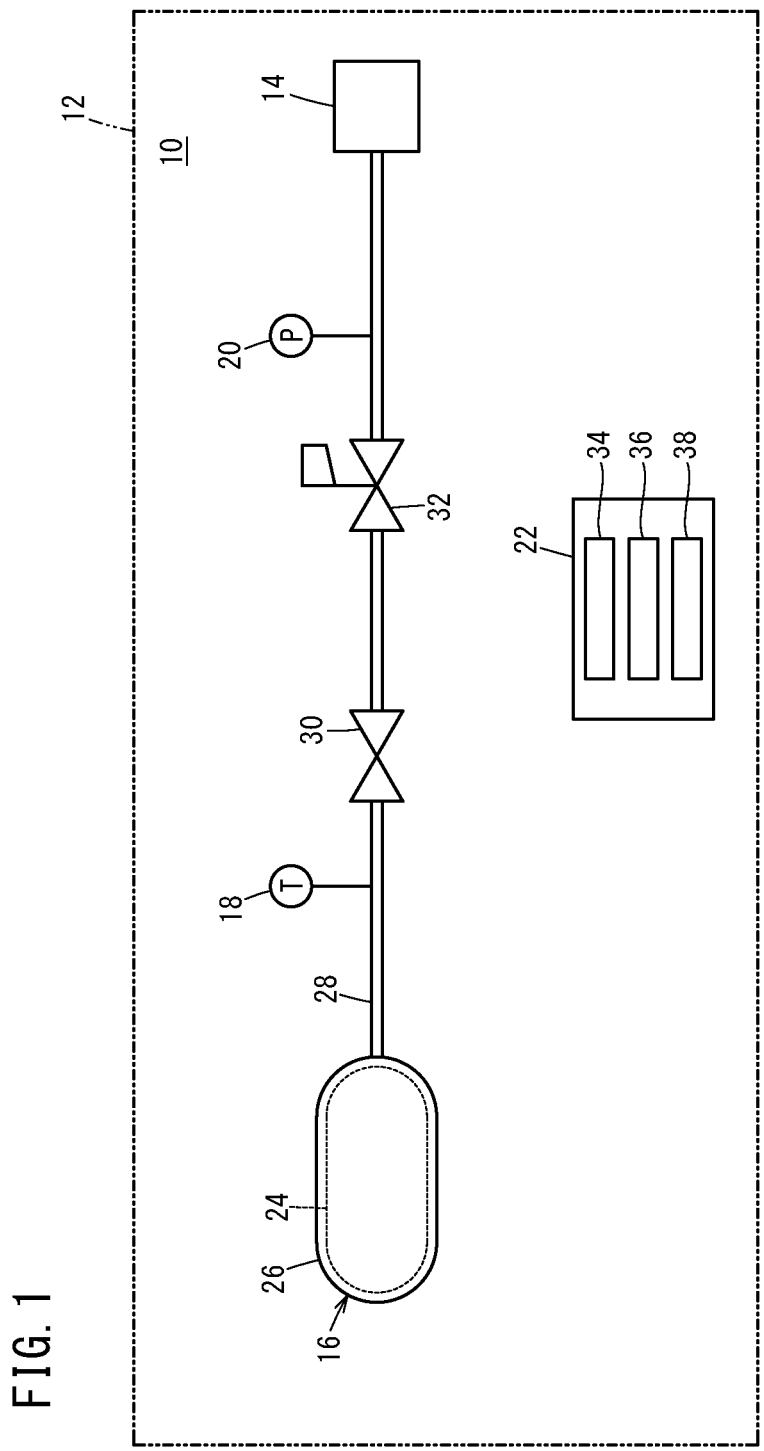
FIG. 1 is a schematic configuration diagram of a high pressure tank residual pressure determination system and a fuel cell vehicle according to an embodiment of the present invention.

Preferred embodiments of a high pressure tank residual pressure determination system, a high pressure tank residual pressure determination method, and a fuel cell vehicle according to the present invention will be presented and described in detail below with reference to the accompanying drawings. In the drawings discussed below, structural elements exhibiting the same or similar functions and effects are denoted by the same reference numerals, and repeated description of such components may be omitted.

As shown in FIG. 1, the high pressure tank residual pressure determination system (hereinafter, referred to simply as a residual pressure determination system) 10 is capable of being suitably used as a system equipped with a high pressure tank 16 that is mounted on a mounting body defined by a fuel cell vehicle 12, and in which hydrogen gas that is supplied to a fuel cell 14 is stored. Thus, according to the present embodiment, although a description will be given concerning an example in which the mounting body is regarded as being the fuel cell vehicle 12, and the high pressure tank 16 accommodates hydrogen gas therein, the present invention is not particularly limited to this example. The residual pressure determination system 10 may be mounted on a mounting body other than the fuel cell vehicle 12, and a gas other than hydrogen gas can be accommodated in the high pressure tank 16.

The residual pressure determination system 10, apart from the high pressure tank 16, is primarily equipped with a temperature measurement unit 18, an internal pressure measurement unit 20, and a control device 22. The high pressure tank 16 includes a liner 24 made of resin and consisting of a hollow body capable of storing hydrogen gas in the interior thereof, and a reinforced layer 26 made of a fiber-reinforced plastic (CFRP) covering an outer surface of the liner 24. Although not shown, the hydrogen gas is capable of being supplied to the interior of the liner 24 from a hydrogen gas supply source via a gas supply flow passage.

The hydrogen gas stored in the high pressure tank 16 is capable of being supplied to the fuel cell 14 through a discharge flow passage 28. Hereinafter, a side of the discharge flow passage 28 on the side of the high pressure tank 16 is defined as an upstream side of the hydrogen gas, and a side of the discharge flow passage 28 on the side of the fuel cell 14 is defined as the downstream side of the hydrogen gas.

The temperature measurement unit 18 is provided in the discharge flow passage 28 in proximity to the high pressure tank 16. The temperature measurement unit 18 measures the temperature of the hydrogen gas inside the high pressure tank 16 (liner 24) as a tank temperature, and outputs a measured temperature value as a measurement result to the control device 22. Moreover, the temperature measurement unit 18 may be provided in the interior of the high pressure tank 16 (liner 24).

A main stop valve 30 is interposed on an upstream side of the discharge flow passage 28, and a pressure regulating valve 32 is interposed on a more downstream side of the discharge flow passage 28 than the main stop valve 30. By placing the main stop valve 30 in an open state, the hydrogen gas released from the high pressure tank 16 flows through the discharge flow passage 28 toward the fuel cell 14, and by placing the main stop valve 30 in a closed state, release of the hydrogen gas from the high pressure tank 16 is stopped. Moreover, the main stop valve 30 may be provided on an inner side of a non-illustrated boss disposed in the high pressure tank 16.

The pressure regulating valve 32 reduces the pressure of the hydrogen gas discharged from the high pressure tank 16, and delivers the gas to the downstream side. In other words, the pressure of the hydrogen gas upstream of the pressure regulating valve 32 corresponds to the tank internal pressure (pressure of the hydrogen gas inside the liner 24) of the high pressure tank 16. When the pressure of the hydrogen gas upstream of the pressure regulating valve 32 is higher than a value suitable for being supplied to the fuel cell 14, the pressure regulating valve 32 reduces the pressure of the hydrogen gas, and thereby sets it to a suitable height for being supplied to the fuel cell 14. Further, when the internal pressure of the high pressure tank 16 is reduced by the pressure regulating valve 32 to the pressure regulated lower limit value, the pressures on the upstream and downstream sides of the pressure regulating valve 32 coincide with each other.

According to the present embodiment, the internal pressure measurement unit 20 is provided on a more downstream side of the discharge flow passage 28 than the pressure regulating valve 32. In the case that the tank internal pressure is higher than a regulated pressure lower limit value by the pressure regulating valve 32, the internal pressure measurement unit 20 measures the pressure of the hydrogen gas that was regulated (adjusted in pressure) by the pressure regulating valve 32. On the other hand, in the case that the tank internal pressure is lowered to the regulated pressure lower limit value by the pressure regulating valve 32, the internal pressure measurement unit 20 can measure as the tank internal pressure the pressure of the hydrogen gas downstream from the pressure regulating valve 32.

Stated otherwise, since the internal pressure measurement unit 20 which is provided on the downstream side of the pressure regulating valve 32 only needs to have a measurement range in a low pressure region that is lower than the pressure regulated lower limit value of the pressure regulating valve 32, it is possible to measure the tank internal pressure with high accuracy in the vicinity of a later-described usage limit threshold value line A (see FIGS. 2 to 4). Moreover, it is satisfactory so long as the internal pressure measurement unit 20 is disposed to be capable of measuring the tank internal pressure, and the location thereof is not particularly limited to being disposed on the downstream side of the pressure regulating valve 32.

The control device 22 is configured in the form of a computer including a CPU and memories and the like (none of which are shown), and includes a storage unit 34, a computation unit 36, and a determination unit 38. The required minimum residual pressure line B shown in FIGS. 2 to 4, an allowable temperature range, and the like are stored in the storage unit 34. The required minimum residual pressure line B is a function of the tank temperature and is indicative of a required minimum value of the tank internal pressure, which is predetermined beforehand in accordance with the specifications of the high pressure tank 16 and the like.

As noted previously, in the case that the high pressure tank 16 includes the resin liner 24 and the reinforced layer 26 made of CFRP or the like covering the outer surface of the liner 24, the hydrogen gas accommodated inside the liner 24 may penetrate through the liner 24 and enter into an interval or the like (hereinafter also referred to as a covered portion) between the liner 24 and the reinforced layer 26.

In a state in which the hydrogen gas is accumulated and remains in the covered portion, when the internal pressure inside the tank is reduced and becomes lower than the internal pressure of the covered portion, there is a concern that the liner 24 and the reinforced layer 26 may peel off or separate from one another, and the liner 24 may undergo buckling or the like and be likely to protrude toward the interior thereof. Thus, for example, the required minimum residual pressure line B can be provided as a line indicative of required minimum values for each of the tank internal pressure and the tank temperature, so as to be capable of maintaining a state in which the aforementioned peeling and buckling or the like can be suppressed.

Figure 2:
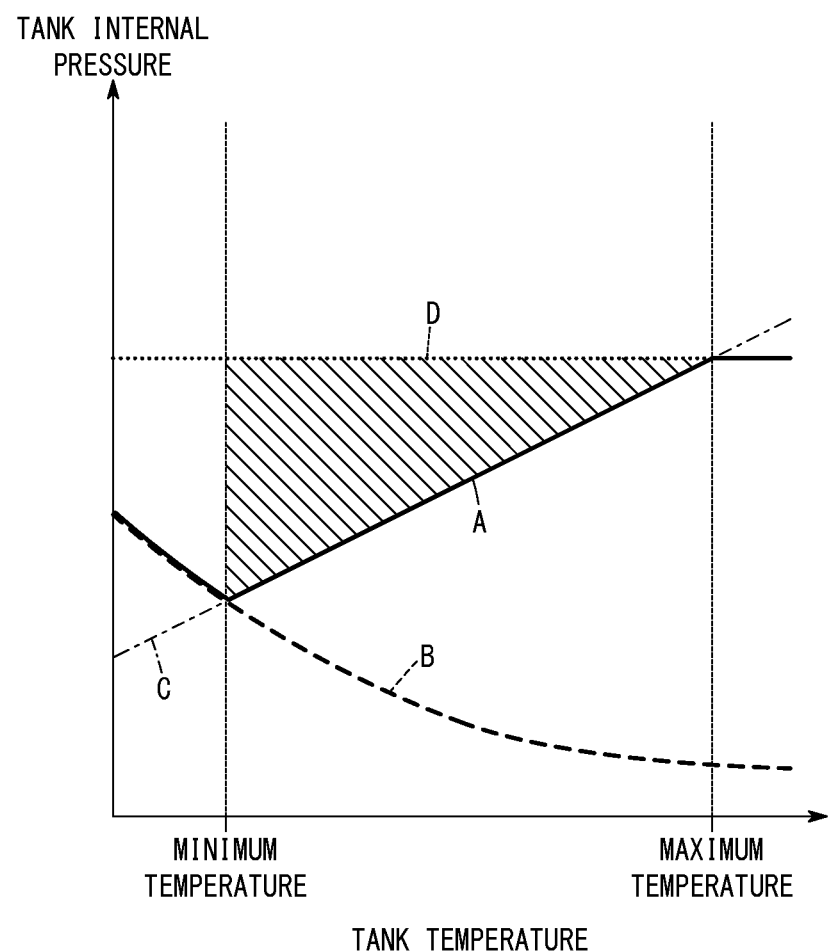
FIG. 2 is a graph illustrating a relationship between a tank temperature and a tank internal pressure, for the purpose of explaining a calculation step.
Figure 3:
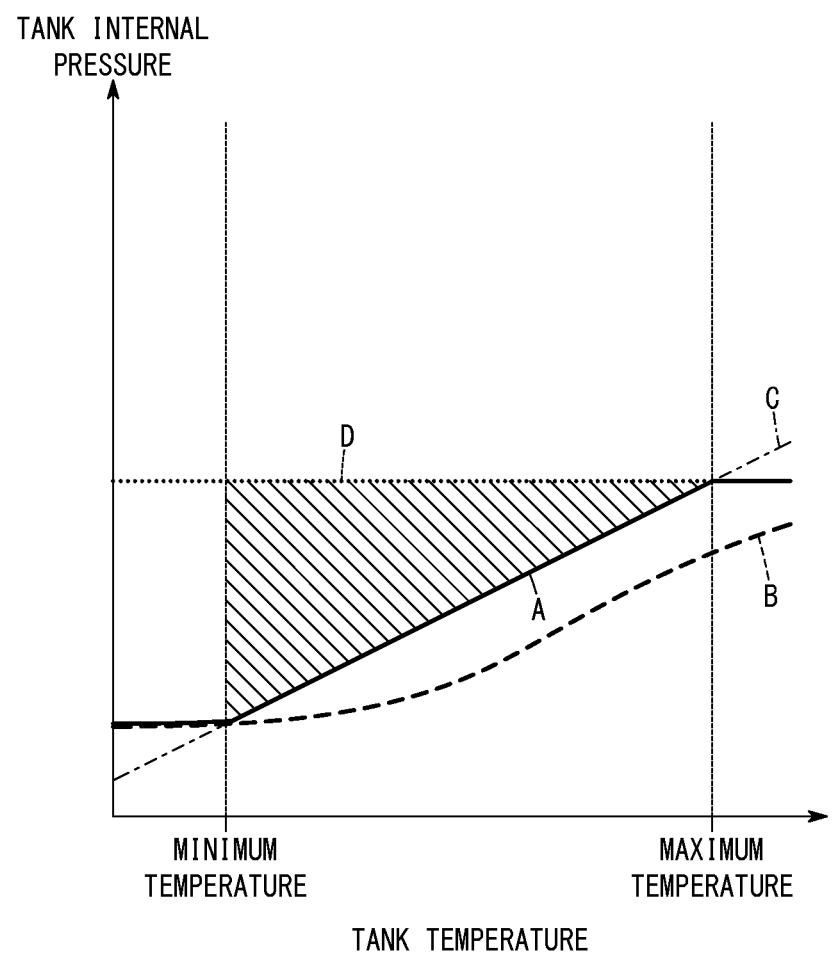
FIG. 3 is another graph illustrating a relationship between the tank temperature and the tank internal pressure, for the purpose of explaining the calculation step.
Figure 4:
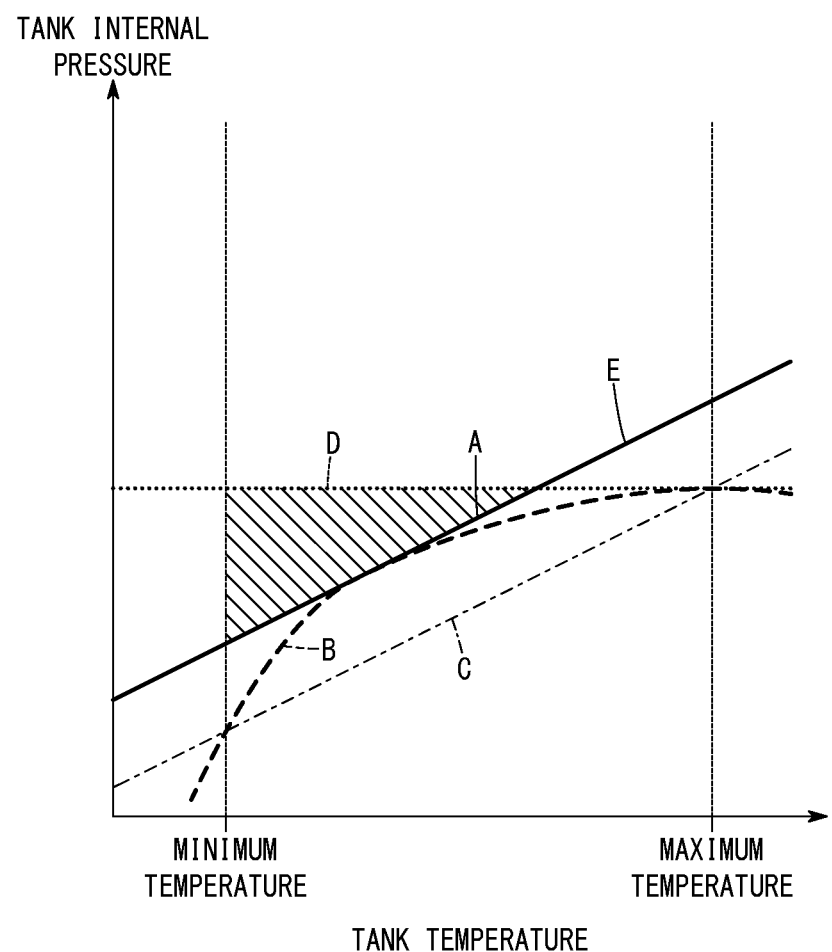
FIG. 4 is still another graph illustrating a relationship between the tank temperature and the tank internal pressure, for the purpose of explaining the calculation step.

The required minimum residual pressure line B can be defined by various functions depending on the specifications of the high pressure tank 16 and the like, and as a portion of such functions, the required minimum residual pressure lines B indicated by dashed lines shown respectively in FIGS. 2 to 4 are exemplified.

The allowable temperature range is an allowable (guaranteed) range of an environmental temperature at which the high pressure tank 16 is used. In the case that the high pressure tank 16 is installed in the fuel cell vehicle 12, for example, a minimum temperature within the allowable temperature range (hereinafter, simply referred to as a minimum temperature), and a maximum temperature within the allowable temperature range (hereinafter, simply referred to as a maximum temperature) are preferably set respectively, taking into consideration usage thereof in a cold region, a tropical region, a winter period, or a summer period.

An isopycnic line C (see FIGS. 2 and 3) is obtained from the required minimum residual pressure line B and the minimum temperature. The isopycnic line C is indicative of a relationship between the tank temperature and the tank internal pressure, when the density of the hydrogen gas is maintained with the tank internal pressure at the minimum temperature being on the required minimum residual pressure line B. Moreover, the isopycnic line C is represented, for example, by the equation of state of an ideal gas ($PV=nRT$, P: pressure, V: volume, n: mole number, R: gas constant, T: Kelvin temperature), and can be obtained by using a line in which a deviation between the actual gas and an ideal gas is taken into consideration. The isopycnic line C is calculated in advance and stored in the storage unit 34. The isopycnic line C may be calculated by the computation unit 36.

Using at least one of the required minimum residual pressure line B and the isopycnic line C, a usage limit threshold value line A, which is a function of the tank temperature and is indicative of a usage limit threshold value of the tank internal pressure, is calculated and stored in the storage unit 34. The usage limit threshold value line A may be calculated beforehand and stored in the storage unit 34, or may be calculated by the computation unit 36 and thereafter stored in the storage unit 34.

The computation unit 36 calculates as a corresponding usage limit threshold value the tank internal pressure on the usage limit threshold value line A corresponding to the temperature measurement value input from the temperature measurement unit 18. The usage limit threshold value of the tank internal pressure is a threshold value for the purpose of stopping further release of the gas from the high pressure tank 16, and the usage limit threshold value line A serves to indicate the usage limit threshold value for each of respective tank temperatures. The corresponding usage limit threshold value is a usage limit threshold value when the tank temperature is at the measured temperature value.

For example, as shown in FIGS. 2 to 4, the tank internal pressure indicated by the usage limit threshold value line A is greater than or equal to the tank internal pressure indicated by the required minimum residual pressure line B. As shown in FIGS. 2 and 3, in the case that the entirety of the tank internal pressure indicated by the required minimum residual pressure line B within the allowable temperature range is less than or equal to the tank internal pressure indicated by the isopycnic line C, the usage limit threshold value line A within the allowable temperature range is greater than or equal to the tank internal pressure indicated by the isopycnic line C. On the other hand, as shown in FIG. 4, in the case that at least a portion of the tank internal pressure indicated by the required minimum residual pressure line B within the allowable temperature range exceeds the tank internal pressure indicated by the isopycnic line C, the tank internal pressure indicated by the usage limit threshold value line A within the allowable temperature range becomes greater than or equal to the tank internal pressure indicated by a tangent line E obtained by moving the isopycnic line C to a side where the tank internal pressure becomes higher so that the isopycnic line C contacts the required minimum residual pressure line B. Moreover, the tangent line E is obtained by using both the required minimum residual pressure line B and the isopycnic line C.

Further, as shown in FIGS. 2 to 4, at least a portion of the tank internal pressure indicated by the usage limit threshold value line A within the allowable pressure range becomes lower as the tank temperature becomes lower. Stated otherwise, the usage limit threshold value line A within the allowable temperature range includes a portion that becomes lower to the left regardless of whether it is a straight line or a curved line.

The determination unit 38 compares the corresponding usage limit threshold value and the measured internal pressure value that is input from the internal pressure measurement unit 20. In addition, in the case that it is determined that the measured internal pressure value has decreased to the corresponding usage limit threshold value, the main stop valve 30 is placed in a closed state and release of the gas from the high pressure tank 16 is stopped. Consequently, using the residual pressure determination system 10, it is possible to manage the internal pressure of the high pressure tank 16 so as not to fall below the required minimum residual pressure line B.

In this instance, as an example of a specific calculation method of the usage limit threshold value line A, for example, as shown in FIGS. 2 and 3, a description will be given of a case in which, within the allowable temperature range, the entirety of the tank internal pressure indicated by the required minimum residual pressure line B is less than or equal to the tank internal pressure indicated by the isopycnic line C, and the measurement error amounts Q1 and Q2 of the internal pressure measurement unit 20 and the temperature measurement unit 18 are not adjusted. In this case, at a tank temperature lower than the minimum temperature, the usage limit threshold value line A is calculated using either one, for which the tank internal pressure is higher, of the required minimum residual pressure line B and the isopycnic line C. As shown in FIGS. 2 and 3, at a tank temperature which is lower than the minimum temperature, since the tank internal pressure indicated by the required minimum residual pressure line B is higher than the tank internal pressure indicated by the isopycnic line C, the required minimum residual pressure line B is used as the usage limit threshold value line A.

On the other hand, at a tank temperature which is greater than or equal to the minimum temperature, the usage limit threshold value line A is calculated using either one, for which the tank internal pressure is higher, of the maximum temperature internal pressure line D and the isopycnic line C. The maximum temperature internal pressure line D is indicative of the tank internal pressure on the isopycnic line C corresponding to the maximum temperature. Moreover, at a tank temperature which is higher than the maximum temperature, although not illustrated, in the case that the tank internal pressure indicated by the required minimum residual pressure line B is higher than the tank internal pressure indicated by the maximum temperature internal pressure line D and the tank internal pressure indicated by the isopycnic line C, the usage limit threshold value line A is calculated using the required minimum residual pressure line B.

In FIGS. 2 and 3, at a tank temperature between the minimum temperature and the maximum temperature, since the tank internal pressure indicated by the isopycnic line C is lower than the tank internal pressure indicated by the maximum temperature internal pressure line D, the tank internal pressure indicated by the isopycnic line C is used as the usage limit threshold value line A. Further, at a tank temperature higher than the maximum temperature, since the tank internal pressure indicated by the maximum temperature internal pressure line D is lower than the tank internal pressure indicated by the isopycnic line C, the maximum temperature internal pressure line D is used as the usage limit threshold value line A.

Next, as an example of a specific calculation method of the usage limit threshold value line A, for example, as shown in FIG. 4, a description will be given of a case in which, within the allowable temperature range, at least a portion of the tank internal pressure indicated by the required minimum residual pressure line B exceeds the tank internal pressure indicated by the isopycnic line C, and the measurement error amounts Q1 and Q2 are not adjusted. In this case, at a tank temperature lower than the minimum temperature, the usage limit threshold value line A is calculated using either one, for which the tank internal pressure is higher, of the tangent line E and the required minimum residual pressure line B. In FIG. 4, at a tank temperature lower than the minimum temperature, since the tank internal pressure indicated by the tangent line E is higher than the tank internal pressure indicated by the required minimum residual pressure line B, the tangent line E is used as the usage limit threshold value line A.

On the other hand, at a tank temperature greater than or equal to the minimum temperature, the usage limit threshold value line A is calculated using the tangent line E. Moreover, at a tank temperature which is higher than the maximum temperature, although not illustrated, in the case that the tank internal pressure indicated by the required minimum residual pressure line B is higher than the tank internal pressure indicated by the tangent line E, the usage limit threshold value line A is calculated using the required minimum residual pressure line B.

When the usage limit threshold value line A is calculated in the manner described above, the measurement error amounts Q1 and Q2 of the temperature measurement unit 18 and the internal pressure measurement unit 20 may be adjusted. For example, as shown in FIG. 2, a description will be given concerning a case in which the usage limit threshold value line A is calculated after having adjusted the measurement error amounts Q1 and Q2 in the high pressure tank 16 (see FIG. 1) in which, within the allowable temperature range, the entirety of the tank internal pressure indicated by the required minimum residual pressure line B is less than or equal to the tank internal pressure indicated by the isopycnic line C. In this case, as shown in FIGS. 5A and 5B, in relation to each of the required minimum residual pressure line B, the isopycnic line C, and the maximum temperature internal pressure line D, addition or subtraction is performed to shift the measurement error amounts Q1 and Q2 to the side where the tank internal pressure becomes higher.

Figure 5:
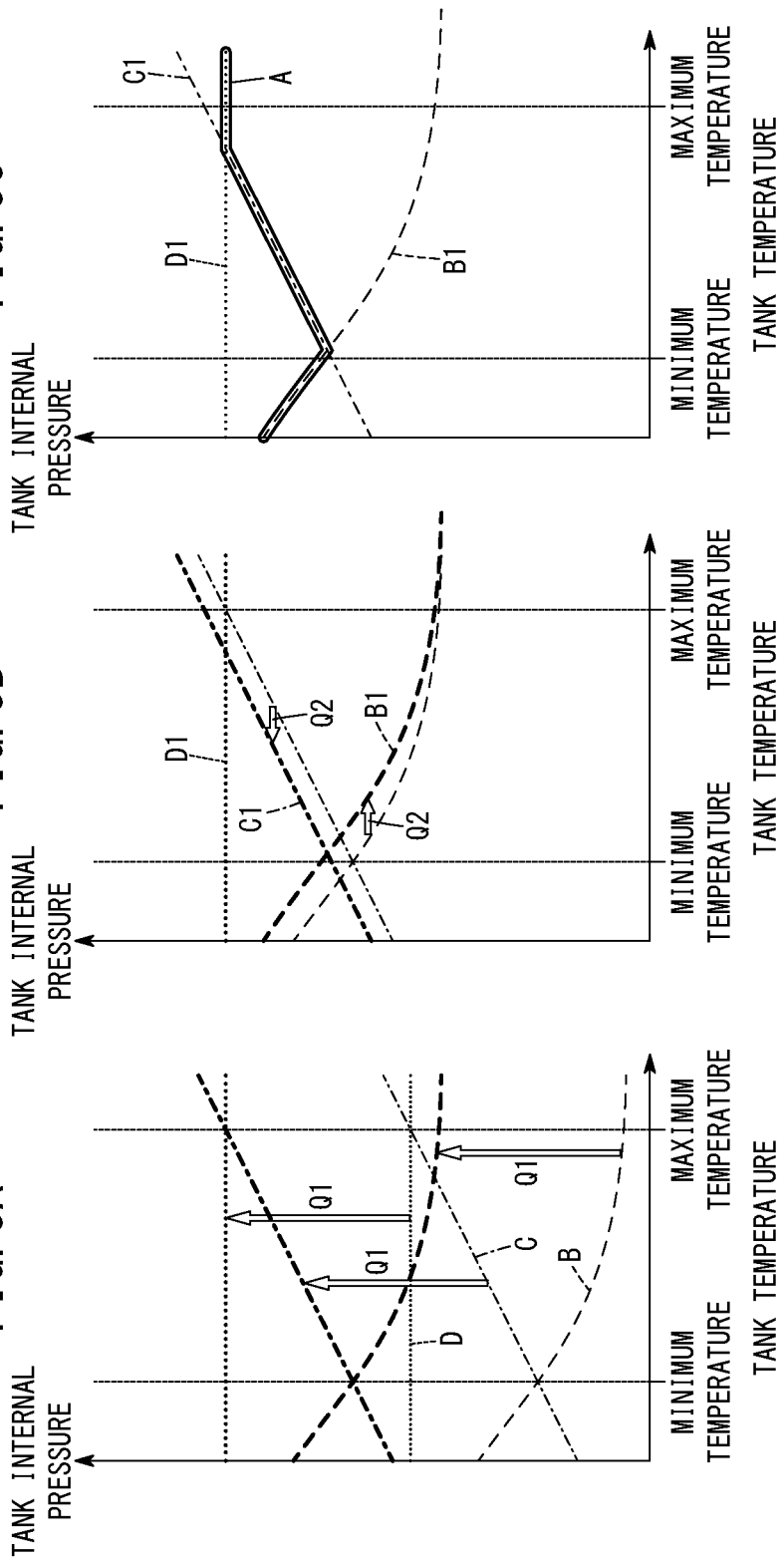
FIGS. 5A, 5B and 5C are graphs illustrating a relationship between the tank temperature and the tank internal pressure, for the purpose of explaining the calculation step for a case in which measurement error amounts of a temperature measurement unit and an internal pressure measurement unit are adjusted.

More specifically, as shown in FIG. 5A, in relation to each of the required minimum residual pressure line B, the isopycnic line C, and the maximum temperature internal pressure line D, the measurement error amount Q1 of the internal pressure measurement unit 20 is shifted to the upper side (the high pressure side). Further, as shown in FIG. 5B, in relation to the required minimum residual pressure line B (see FIG. 5A) that slopes downward, the measurement error amount Q2 of the temperature measurement unit 18 is shifted to the right side (the high temperature side). In relation to the isopycnic line C (see FIG. 5A) that slopes upward, the measurement error amount Q2 is shifted to the left side (the low temperature side). Moreover, since the maximum temperature internal pressure line D remains constant regardless of the tank temperature, no change is made thereto even if the measurement error amount Q2 of the temperature measurement unit 18 is shifted.

Due to such characteristics, each of the required minimum residual pressure line B, the isopycnic line C, and the maximum temperature internal pressure line D is shifted by the measurement error amounts Q1 and Q2 to the side where the tank internal pressure becomes higher, and as shown in FIGS. 5B and 5C, a required minimum residual pressure line for error adjustment B1, an isopycnic line for error adjustment C1, and a maximum temperature internal pressure line for error adjustment D1 are obtained. As shown in FIG. 5C, at a tank temperature lower than the minimum temperature, the usage limit threshold value line A is calculated using either one, for which the tank internal pressure is higher, of the required minimum residual pressure line for error adjustment B1 and the isopycnic line for error adjustment C1.

On the other hand, at a tank temperature greater than or equal to the minimum temperature, the usage limit threshold value line A is calculated using either, one for which the tank internal pressure is lower, from among the one, for which the tank internal pressure is higher, of the required minimum residual pressure line for error adjustment B1 and the isopycnic line for error adjustment C1, and the maximum temperature internal pressure line for error adjustment D1.

Further, for example, in a similar manner, concerning the high pressure tank 16 in which the required minimum value of the tank internal pressure is determined by the required minimum residual pressure line B shown in FIG. 3, the usage limit threshold value line A can be calculated by adjusting the measurement error amounts Q1 and Q2.

Next, for example, as shown in FIG. 4, a description will be given concerning a case in which the usage limit threshold value line A is calculated after having adjusted the measurement error amounts Q1 and Q2 in the high pressure tank 16 (see FIG. 1) in which, within the allowable temperature range, at least a portion of the tank internal pressure indicated by the required minimum residual pressure line B exceeds the tank internal pressure indicated by the isopycnic line C. In this case, as shown in FIGS. 6A and 6B, in relation to each of the required minimum residual pressure line B and the tangent line E, addition or subtraction is performed to shift the measurement error amounts Q1 and Q2 to the side where the tank internal pressure becomes higher.

Figure 6:
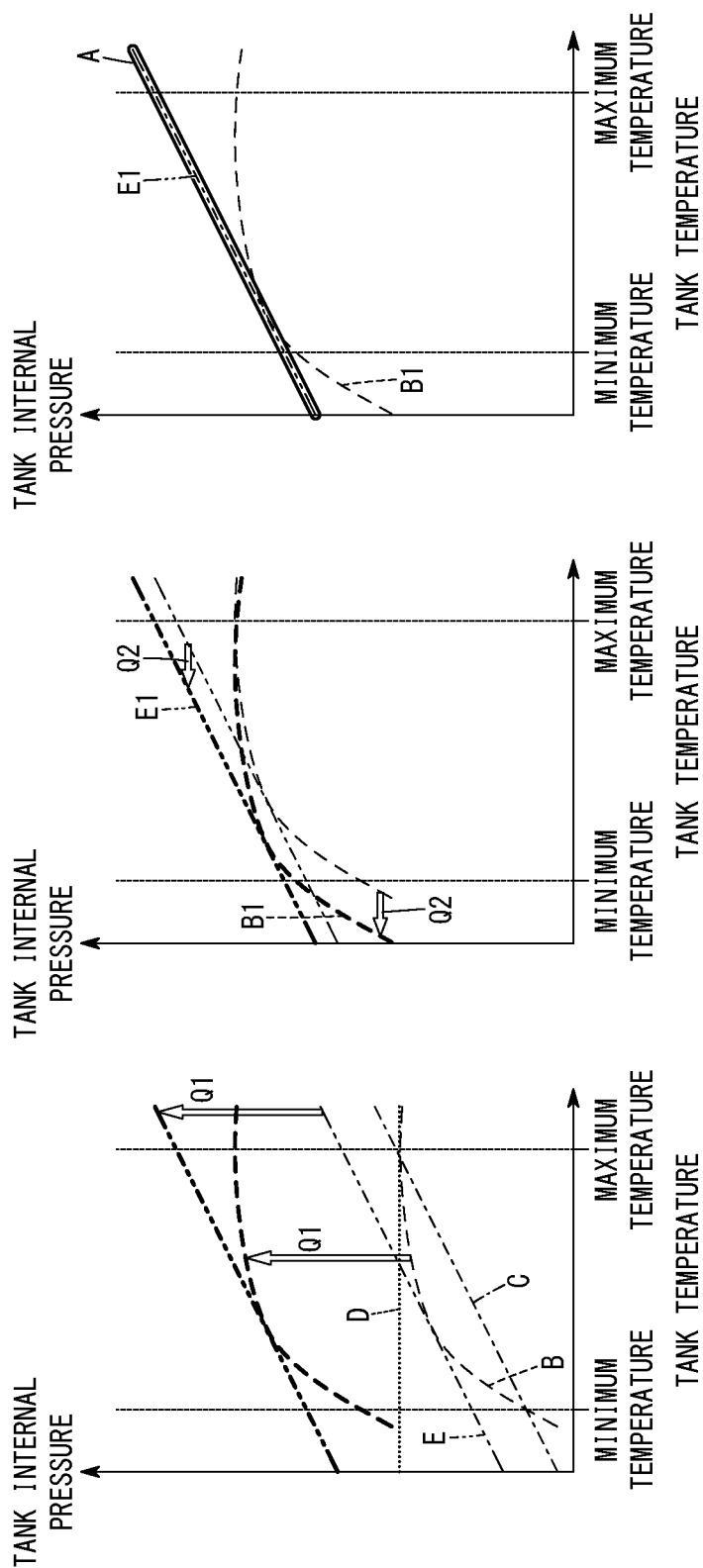
FIGS. 6A, 6B and 6C are other graphs illustrating a relationship between the tank temperature and the tank internal pressure, for the purpose of explaining the calculation step for a case in which measurement error amounts of a temperature measurement unit and an internal pressure measurement unit are adjusted.

More specifically, as shown in FIG. 6A, in relation to each of the required minimum residual pressure line B and the tangent line E, the measurement error amount Q1 of the internal pressure measurement unit 20 is shifted to the upper side (the high pressure side). Further, as shown in FIG. 6B, in relation to each of the required minimum residual pressure line B and the tangent line E (see FIG. 6A) that slope upward, the measurement error amount Q2 of the temperature measurement unit 18 is shifted to the left side (the low temperature side).

Due to such characteristics, each of the required minimum residual pressure line B and the tangent line E is shifted by the measurement error amounts Q1 and Q2 to the side where the tank internal pressure becomes higher, and as shown in FIGS. 6B and 6C, the required minimum residual pressure line for error adjustment B1 and a tangent line for error adjustment E1 are obtained. As shown in FIG. 6C, at a tank temperature lower than the minimum temperature, the usage limit threshold value line A is calculated using either one, for which the tank internal pressure is higher, of the required minimum residual pressure line for error adjustment B1 and the tangent line for error adjustment E1. On the other hand, at a tank temperature greater than or equal to the minimum temperature, the usage limit threshold value line A is calculated using the tangent line for error adjustment E1.

The residual pressure determination system 10 according to the present embodiment is basically configured in the manner described above. In such a residual pressure determination system 10, in an opened state of the main stop valve 30, hydrogen gas is supplied to the fuel cell 14 from the interior of the high pressure tank 16, and electrical power can be obtained by the hydrogen gas being consumed in electrochemical reactions (power generating reactions) that take place in the fuel cell 14. Using such electrical power, the fuel cell vehicle 12 can be made to travel.

Figure 7:
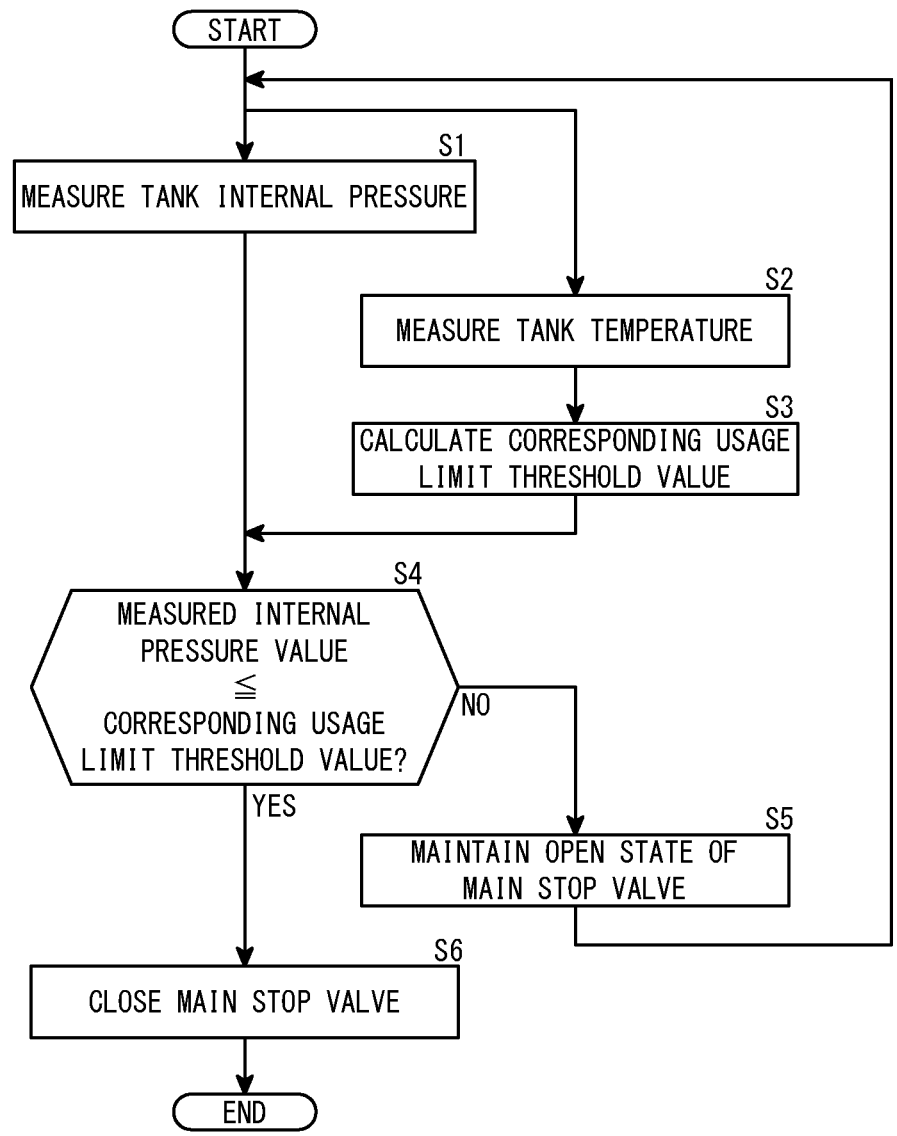
FIG. 7 is a flowchart illustrating an example of a method of determining a residual pressure of a high pressure tank according to an embodiment of the present invention.

Together with reference to FIG. 7, a description will be given of a residual pressure determination method for the high pressure tank 16 (hereinafter, referred to simply as a residual pressure determination method) in which the residual pressure determination system 10 according to the present embodiment is used. In such a residual pressure determination method, initially, a measurement step is performed in which the tank internal pressure is measured by the internal pressure measurement unit 20 in order to obtain the measured internal pressure value (step S1), together with the tank temperature being measured by the temperature measurement unit 18 in order to obtain the measured temperature value (step S2). The measured internal pressure value and the measured temperature value obtained in the measurement step are input to the control device 22.

Next, a calculation step (step S3) is performed using the usage limit threshold value line A calculated using at least one of the required minimum residual pressure line B and the isopycnic line C, to thereby determine, as a corresponding usage limit threshold value, the tank internal pressure on the usage limit threshold value line A corresponding to the temperature measurement value input from the temperature measurement unit 18.

The specific calculation method of the usage limit threshold value line A is as described above. More specifically, within the allowable temperature range, in the case that the entirety of the tank internal pressure indicated by the required minimum residual pressure line B is less than or equal to the tank internal pressure indicated by the isopycnic line C, the usage limit threshold value line A can be calculated, for example, as shown in FIGS. 2 and 3. At this time, when the measurement error amounts Q1 and Q2 of the internal pressure measurement unit 20 and the temperature measurement unit 18 are taken into consideration, the usage limit threshold value line A can be calculated, for example, as shown in FIGS. 5A to 5C. In this manner, the corresponding usage limit threshold value can be determined from the usage limit threshold value line A that was calculated in this manner, and the measured temperature value.

On the other hand, within the allowable temperature range, in the case that at least a portion of the tank internal pressure indicated by the required minimum residual pressure line B exceeds the tank internal pressure indicated by the isopycnic line C, the usage limit threshold value line A can be calculated, for example, as shown in FIG. 4. At this time, when the measurement error amounts Q1 and Q2 of the internal pressure measurement unit 20 and the temperature measurement unit 18 are taken into consideration, the usage limit threshold value line A can be calculated, for example, as shown in FIGS. 6A to 6C. In this manner, the corresponding usage limit threshold value can be determined from the usage limit threshold value line A that was calculated in this manner, and the measured temperature value.

Next, the determination unit 38 performs a determination step (step S4) of determining whether or not the measured internal pressure value input from the internal pressure measurement unit 20 is less than or equal to the corresponding usage limit threshold value that was calculated in the calculation step. In the case it is determined in the determination step that the measured internal pressure value is higher than the corresponding usage limit threshold value (step S4: NO), the process proceeds to step S5, and the main stop valve 30 is maintained in an open state. Thereafter, the process returns to the aforementioned measurement step.

In the case it is determined in the determination step that the measured internal pressure value is less than or equal to the corresponding usage limit threshold value (step S4: YES), the process proceeds to step S6, whereupon by closing the main stop valve 30, a stoppage step is carried out to stop release of the gas from the high pressure tank 16. Upon completion of the process of step S6, the flowchart according to the present embodiment comes to an end.

With the residual pressure determination system 10 and the residual pressure determination method according to the present embodiment, using at least one of the required minimum residual pressure line B and the isopycnic line C, the usage limit threshold value line A is calculated, and the corresponding usage limit threshold value is determined from the usage limit threshold value line A, and the measured temperature value measured by the temperature measurement unit 18. In addition, in the case that it is determined that the measured internal pressure value measured by the internal pressure measurement unit 20 has decreased to the corresponding usage limit threshold value, release of the gas from the high pressure tank 16 is stopped.

The tank internal pressure indicated by the usage limit threshold value line A within the allowable temperature range is greater than or equal to the tank internal pressure indicated by the isopycnic line C, or is greater than or equal to the tank internal pressure indicated by the tangent line E. Therefore, at the time that usage of the high pressure tank 16 is stopped, even if the tank temperature changes within the allowable temperature range in a state in which the gas density inside the high pressure tank 16 is maintained, it is possible to avoid a situation in which the actual tank internal pressure (measured internal pressure value) falls below the tank internal pressure indicated by the required minimum residual pressure line B.

Further, at least a portion of the tank internal pressure indicated by the usage limit threshold value line A within the allowable pressure range becomes lower as the tank temperature becomes lower. In this manner, the usage limit threshold value line A is set, and the corresponding usage limit threshold value is calculated corresponding to each of respective measured temperature values. Consequently, for example, in comparison with a case in which the usage limit threshold value line A is set to be constant regardless of the tank temperature, within the allowable temperature range, the corresponding usage limit threshold value can be prevented from becoming higher than necessary in relation to the tank internal pressure indicated by the required minimum residual pressure line B.

Therefore, it is possible to avoid a situation in which usage of the high pressure tank 16 is stopped in a state in which hydrogen gas having a tank internal pressure significantly in excess of the tank internal pressure indicated by the required minimum residual pressure line B remains within the high pressure tank 16, and the hydrogen gas that is stored in the high pressure tank 16 can be used effectively. Such an effect can be obtained quite remarkably in the case that the hydrogen storage amount (capacity) is large, such as when the high pressure tank 16 is mounted on a stationary mounting body, or when the high pressure tank 16 is mounted on the fuel cell vehicle 12 in the form of a large scale trailer or the like.

In this instance, for example, as the usage limit threshold value line according to a comparative example, in the case that the maximum temperature internal pressure line D is adopted in which the tank internal pressure remains constant regardless of the tank temperature, at the point at which the measured internal pressure value reaches the maximum temperature internal pressure, regardless of the tank temperature, release of the gas from the high pressure tank 16 is stopped. However, for example, as shown in FIGS. 2 to 4, within the allowable temperature range, if the measured internal pressure value is maintained greater than or equal to the tank internal pressure indicated by the isopycnic line C or the tank internal pressure indicated by the tangent E, even if the tank temperature changes within the allowable range, it is possible to avoid a situation in which the actual tank internal pressure falls below the tank internal pressure indicated by the required minimum residual pressure line B.

Therefore, at least within the allowable temperature range, by setting the usage limit threshold value line A as in the present embodiment, compared to the case in which the maximum temperature internal pressure line D is set as the usage limit threshold value line, it becomes possible to effectively utilize the gas having a density within the area indicated by hatching in FIGS. 2 to 4.

For example, in the high pressure tank 16 that is mounted in the fuel cell vehicle 12, hydrogen gas having a pressure less than or equal to the tank internal pressure indicated by the usage limit threshold value line A is not used as a fuel, and becomes an ineffective remaining amount. Accordingly, by setting the usage limit threshold value line A in the manner described above, it is possible to reduce the ineffective remaining amount, while avoiding a situation in which the tank internal pressure of the high pressure tank 16 falls below the required minimum residual pressure. Stated otherwise, among the hydrogen gas that is stored in the high pressure tank 16, it is possible to increase the percentage of the effective hydrogen gas amount that can be used as a fuel.

Consequently, it is possible to increase the effective hydrogen gas amount while maintaining the size (capacity) of the high pressure tank 16, or to reduce the size of the high pressure tank 16 while maintaining the effective hydrogen gas amount of the high pressure tank 16. If the effective hydrogen gas amount is increased, the cruising distance of the fuel cell vehicle 12 can be increased. Further, if the size and scale of the high pressure tank 16 is reduced, it is possible to reduce the cost and weight of the high pressure tank 16.

As can be appreciated from the above, in accordance with the residual pressure determination system 10 and the residual pressure determination method according to the present invention, even if the tank temperature changes within an allowable temperature range when usage of the high pressure tank 16 is stopped, the actual tank internal pressure of the high pressure tank 16 can be prevented from falling below the tank internal pressure indicated by the required minimum residual pressure line B, and the gas that is stored in the high pressure tank 16 can be used effectively.

In the residual pressure determination system 10 and the residual pressure determination method according to the above-described embodiment, within the allowable temperature range, in the case that the entirety of the tank internal pressure indicated by the required minimum residual pressure line B is less than or equal to the tank internal pressure indicated by the isopycnic line C, and the measurement error amounts Q1 and Q2 of the internal pressure measurement unit 20 and the temperature measurement unit 18 are not adjusted, at a tank temperature lower than the minimum temperature, the usage limit threshold value line A is calculated using either one, for which the tank internal pressure is higher, of the required minimum residual pressure line B and the isopycnic line C, and when the tank internal pressure on the isopycnic line C corresponding to the maximum temperature within the allowable temperature range is indicated by the maximum temperature internal pressure line D, at a tank temperature greater than or equal to the minimum temperature, the usage limit threshold value line A is calculated using either one, for which the tank internal pressure is lower, of the maximum temperature internal pressure line D and the isopycnic line C.

Further, in the residual pressure determination system 10 and the residual pressure determination method according to the above-described embodiment, within the allowable temperature range, in the case that at least a portion of the tank internal pressure indicated by the required minimum residual pressure line B exceeds the tank internal pressure indicated by the isopycnic line C, and the measurement error amounts Q1 and Q2 of the internal pressure measurement unit 20 and the temperature measurement unit 18 are not adjusted, at a tank temperature lower than the minimum temperature, the usage limit threshold value line A is calculated using either one, for which the tank internal pressure is higher, of the tangent line E and the required minimum residual pressure line B, and at a tank temperature greater than or equal to the minimum temperature, the usage limit threshold value line A is calculated using the tangent line E.

In such cases, even if the tank temperature changes within the allowable temperature range when usage of the high pressure tank 16 is stopped, the actual tank internal pressure can effectively be prevented from falling below the tank internal pressure indicated by the required minimum residual pressure line B, and it becomes possible for the gas that is stored in the high pressure tank 16 to be used more effectively.

In the residual pressure determination system 10 and the residual pressure determination method according to the above-described embodiment, within the allowable temperature range, in the case that the entirety of the tank internal pressure indicated by the required minimum residual pressure line B is less than or equal to the tank internal pressure indicated by the isopycnic line C, and the measurement error amounts Q1 and Q2 of the internal pressure measurement unit 20 and the temperature measurement unit 18 are adjusted, at a tank temperature lower than the minimum temperature, the usage limit threshold value line A is calculated using either one, for which the tank internal pressure is higher, of the required minimum residual pressure line for error adjustment B1 and the isopycnic line for error adjustment C1 respectively obtained by performing, on the required minimum residual pressure line B and the isopycnic line C, addition or subtraction to shift the measurement error amounts Q1 and Q2 to the side where the tank internal pressure becomes higher. Further, when the tank internal pressure on the isopycnic line C corresponding to the maximum temperature within the allowable temperature range is indicated by the maximum temperature internal pressure line D, at a tank temperature greater than or equal to the minimum temperature, the usage limit threshold value line A is calculated using either one, for which the tank internal pressure is lower, from among the one, for which the tank internal pressure is higher, of the required minimum residual pressure line for error adjustment B1 and the isopycnic line for error adjustment C1, and the maximum temperature internal pressure line for error adjustment D1 obtained by performing addition or subtraction to the maximum temperature internal pressure line D.

Further, in the residual pressure determination system 10 and the residual pressure determination method according to the above-described embodiment, within the allowable temperature range, in the case that at least a portion of the tank internal pressure indicated by the required minimum residual pressure line B exceeds the tank internal pressure indicated by the isopycnic line C, and the measurement error amounts Q1 and Q2 of the internal pressure measurement unit 20 and the temperature measurement unit 18 are adjusted, at a tank temperature lower than the minimum temperature, the usage limit threshold value line A is calculated using either one, for which the tank internal pressure is higher, of the tangent line for error adjustment E1 and the required minimum residual pressure line for error adjustment B1 respectively obtained by performing, on the tangent line E and the required minimum residual pressure line B, addition or subtraction to shift the measurement error amounts Q1 and Q2 to the side where the tank internal pressure becomes higher, and at a tank temperature greater than or equal to the minimum temperature, the usage limit threshold value line A is calculated using the tangent line E1 for error adjustment.

In such cases, even if there is a measurement error in the internal pressure measurement unit 20 or the temperature measurement unit 18, it is possible to more reliably suppress the actual tank internal pressure from falling below the tank internal pressure indicated by the required minimum residual pressure line B.

In the residual pressure determination system 10 according to the above-described embodiment, when having determined that the measured internal pressure value is less than or equal to the corresponding usage limit threshold value, the determination unit 38 closes, by the main stop valve 30, the discharge flow passage 28 for the gas of the high pressure tank 16. However, further release of the gas from the high pressure tank 16 may be stopped by a method other than closing the main stop valve 30.

The present invention is not particularly limited to the above-described embodiments, and various modifications can be made thereto within a range that does not deviate from the essence and gist of the present invention.

What is claimed is:

1. A residual pressure determination system for a high pressure tank having a resin liner configured to store a gas therein, and a reinforced layer covering an outer surface of the liner, the residual pressure determination system for the high pressure tank comprising:
an internal pressure measurement unit configured to measure a tank internal pressure, which is a pressure of the gas inside the liner, to thereby obtain a measured internal pressure value;
a temperature measurement unit configured to measure a tank temperature, which is a temperature of the gas inside the liner, to thereby obtain a measured temperature value;
a storage unit configured to store a usage limit threshold value line which is a function of the tank temperature and is indicative of a usage limit threshold value of the tank internal pressure, the usage limit threshold value line being calculated using at least one of a required minimum residual pressure line which is a function of the tank temperature and is indicative of a required minimum value of the tank internal pressure, and an isopycnic line indicative of a relationship between the tank temperature and the tank internal pressure in which a density of the gas is maintained with the tank internal pressure being on the required minimum residual pressure line at a minimum temperature within an allowable temperature range that is an allowable range of an environmental temperature at which the high pressure tank is used;
a computation unit configured to determine, as a corresponding usage limit threshold value, the tank internal pressure on the usage limit threshold value line corresponding to the measured temperature value; and
a determination unit configured to stop release of the gas from the high pressure tank when having determined that the measured internal pressure value has decreased to the corresponding usage limit threshold value,
wherein the tank internal pressure indicated by the usage limit threshold value line within the allowable temperature range becomes greater than or equal to the tank internal pressure indicated by the isopycnic line, in a case that an entirety of the tank internal pressure indicated by the required minimum residual pressure line within the allowable temperature range is less than or equal to the tank internal pressure indicated by the isopycnic line, and becomes greater than or equal to the tank internal pressure indicated by a tangent line obtained by moving the isopycnic line to a side where the tank internal pressure becomes higher so that the isopycnic line contacts the required minimum residual pressure line, in a case that at least a portion of the tank internal pressure indicated by the required minimum residual pressure line within the allowable temperature range exceeds the tank internal pressure indicated by the isopycnic line, and
at least a portion of the tank internal pressure indicated by the usage limit threshold value line within the allowable temperature range becomes lower as the tank temperature becomes lower.

2. The residual pressure determination system for the high pressure tank according to claim 1, wherein:
within the allowable temperature range, in a case that the entirety of the tank internal pressure indicated by the required minimum residual pressure line is less than or equal to the tank internal pressure indicated by the isopycnic line, and measurement error amounts of the internal pressure measurement unit and the temperature measurement unit are not adjusted,
at the tank temperature lower than the minimum temperature, the usage limit threshold value line is calculated using either one, for which the tank internal pressure is higher, of the required minimum residual pressure line and the isopycnic line; and
when the tank internal pressure on the isopycnic line corresponding to a maximum temperature within the allowable temperature range is indicated by a maximum temperature internal pressure line,
at the tank temperature greater than or equal to the minimum temperature, the usage limit threshold value line is calculated using either one, for which the tank internal pressure is lower, of the maximum temperature internal pressure line and the isopycnic line.

3. The residual pressure determination system for the high pressure tank according to claim 1, wherein:
within the allowable temperature range, in a case that the entirety of the tank internal pressure indicated by the required minimum residual pressure line is less than or equal to the tank internal pressure indicated by the isopycnic line, and measurement error amounts of the internal pressure measurement unit and the temperature measurement unit are adjusted,
at the tank temperature lower than the minimum temperature, the usage limit threshold value line is calculated using either one, for which the tank internal pressure is higher, of a required minimum residual pressure line for error adjustment and an isopycnic line for error adjustment respectively obtained by performing, on the required minimum residual pressure line and the isopycnic line, addition or subtraction to shift the measurement error amounts to the side where the tank internal pressure becomes higher; and
when the tank internal pressure on the isopycnic line corresponding to a maximum temperature within the allowable temperature range is indicated by a maximum temperature internal pressure line,
at the tank temperature greater than or equal to the minimum temperature, the usage limit threshold value line is calculated using either one, for which the tank internal pressure is lower, from among the one, for which the tank internal pressure is higher, of the required minimum residual pressure line for error adjustment and the isopycnic line for error adjustment, and a maximum temperature internal pressure line for error adjustment obtained by performing the addition or subtraction to the maximum temperature internal pressure line.

4. The residual pressure determination system for the high pressure tank according to claim 1, wherein:
within the allowable temperature range, in a case that at least a portion of the tank internal pressure indicated by the required minimum residual pressure line exceeds the tank internal pressure indicated by the isopycnic line, and measurement error amounts of the internal pressure measurement unit and the temperature measurement unit are not adjusted,
at the tank temperature lower than the minimum temperature, the usage limit threshold value line is calculated using either one, for which the tank internal pressure is higher, of the tangent line and the required minimum residual pressure line; and
at the tank temperature greater than or equal to the minimum temperature, the usage limit threshold value line is calculated using the tangent line.

5. The residual pressure determination system for the high pressure tank according to claim 1, wherein:
within the allowable temperature range, in a case that at least a portion of the tank internal pressure indicated by the required minimum residual pressure line exceeds the tank internal pressure indicated by the isopycnic line, and measurement error amounts of the internal pressure measurement unit and the temperature measurement unit are adjusted,
at the tank temperature lower than the minimum temperature, the usage limit threshold value line is calculated using either one, for which the tank internal pressure is higher, of a tangent line for error adjustment and a required minimum residual pressure line for error adjustment respectively obtained by performing, on the tangent line and the required minimum residual pressure line, addition or subtraction to shift the measurement error amounts to the side where the tank internal pressure becomes higher; and
at the tank temperature greater than or equal to the minimum temperature, the usage limit threshold value line is calculated using the tangent line for error adjustment.

6. The residual pressure determination system for the high pressure tank according to claim 1, wherein, when having determined that the measured internal pressure value is less than or equal to the corresponding usage limit threshold value, the determination unit closes, by a main stop valve, a discharge flow passage for the gas of the high pressure tank.

7. A residual pressure determination method for a high pressure tank having a resin liner configured to store a gas therein, and a reinforced layer covering an outer surface of the liner, the residual pressure determination method for the high pressure tank comprising:
a measurement step of measuring, by an internal pressure measurement unit, a tank internal pressure, which is a pressure of the gas inside the liner, to thereby obtain a measured internal pressure value, and measuring, by a temperature measurement unit, a tank temperature, which is a temperature of the gas inside the liner, to thereby obtain a measured temperature value;
a calculation step of determining, as a corresponding usage limit threshold value, the tank internal pressure on a usage limit threshold value line corresponding to the measured temperature value, from the usage limit threshold value line which is a function of the tank temperature and is indicative of a usage limit threshold value of the tank internal pressure, the usage limit threshold value line being calculated using at least one of a required minimum residual pressure line which is a function of the tank temperature and is indicative of a required minimum value of the tank internal pressure, and an isopycnic line indicative of a relationship between the tank temperature and the tank internal pressure in which a density of the gas is maintained with the tank internal pressure being on the required minimum residual pressure line at a minimum temperature within an allowable temperature range that is an allowable range of an environmental temperature at which the high pressure tank is used;
a determination step of determining whether or not the measured internal pressure value has decreased to the corresponding usage limit threshold value; and
a stoppage step of stopping release of the gas from the high pressure tank in a case that it is determined, in the determination step, that the measured internal pressure value is less than or equal to the corresponding usage limit threshold value,
wherein the tank internal pressure indicated by the usage limit threshold value line within the allowable temperature range becomes greater than or equal to the tank internal pressure indicated by the isopycnic line, in a case that an entirety of the tank internal pressure indicated by the required minimum residual pressure line within the allowable temperature range is less than or equal to the tank internal pressure indicated by the isopycnic line, and becomes greater than or equal to the tank internal pressure indicated by a tangent line obtained by moving the isopycnic line to a side where the tank internal pressure becomes higher so that the isopycnic line contacts the required minimum residual pressure line, in a case that at least a portion of the tank internal pressure indicated by the required minimum residual pressure line within the allowable temperature range exceeds the tank internal pressure indicated by the isopycnic line, and
at least a portion of the tank internal pressure indicated by the usage limit threshold value line within the allowable temperature range becomes lower as the tank temperature becomes lower.

8. The residual pressure determination method for the high pressure tank according to claim 7, wherein:
within the allowable temperature range, in a case that the entirety of the tank internal pressure indicated by the required minimum residual pressure line is less than or equal to the tank internal pressure indicated by the isopycnic line, and measurement error amounts of the internal pressure measurement unit and the temperature measurement unit are not adjusted,
at the tank temperature lower than the minimum temperature, the usage limit threshold value line is calculated using either one, for which the tank internal pressure is higher, of the required minimum residual pressure line and the isopycnic line; and
when the tank internal pressure on the isopycnic line corresponding to a maximum temperature within the allowable temperature range is indicated by a maximum temperature internal pressure line,
at the tank temperature greater than or equal to the minimum temperature, the usage limit threshold value line is calculated using either one, for which the tank internal pressure is lower, of the maximum temperature internal pressure line and the isopycnic line.

9. The residual pressure determination method for the high pressure tank according to claim 7, wherein:
within the allowable temperature range, in a case that the entirety of the tank internal pressure indicated by the required minimum residual pressure line is less than or equal to the tank internal pressure indicated by the isopycnic line, and measurement error amounts of the internal pressure measurement unit and the temperature measurement unit are adjusted,
at the tank temperature lower than the minimum temperature, the usage limit threshold value line is calculated using either one, for which the tank internal pressure is higher, of a required minimum residual pressure line for error adjustment and an isopycnic line for error adjustment respectively obtained by performing, on the required minimum residual pressure line and the isopycnic line, addition or subtraction to shift the measurement error amounts to the side where the tank internal pressure becomes higher; and when the tank internal pressure on the isopycnic line corresponding to a maximum temperature within the allowable temperature range is indicated by a maximum temperature internal pressure line,
at the tank temperature greater than or equal to the minimum temperature, the usage limit threshold value line is calculated using either one, for which the tank internal pressure is lower, from among the one, for which the tank internal pressure is higher, of the required minimum residual pressure line for error adjustment and the isopycnic line for error adjustment, and a maximum temperature internal pressure line for error adjustment obtained by performing the addition or subtraction to the maximum temperature internal pressure line.

10. The residual pressure determination method for the high pressure tank according to claim 7, wherein:
within the allowable temperature range, in a case that at least a portion of the tank internal pressure indicated by the required minimum residual pressure line exceeds the tank internal pressure indicated by the isopycnic line, and measurement error amounts of the internal pressure measurement unit and the temperature measurement unit are not adjusted,
at the tank temperature lower than the minimum temperature, the usage limit threshold value line is calculated using either one, for which the tank internal pressure is higher, of the tangent line and the required minimum residual pressure line; and
at the tank temperature greater than or equal to the minimum temperature, the usage limit threshold value line is calculated using the tangent line.

11. The residual pressure determination method for the high pressure tank according to claim 7, wherein:
within the allowable temperature range, in a case that at least a portion of the tank internal pressure indicated by the required minimum residual pressure line exceeds the tank internal pressure indicated by the isopycnic line, and measurement error amounts of the internal pressure measurement unit and the temperature measurement unit are adjusted,
at the tank temperature lower than the minimum temperature, the usage limit threshold value line is calculated using either one, for which the tank internal pressure is higher, of a tangent line for error adjustment and a required minimum residual pressure line for error adjustment respectively obtained by performing, on the tangent line and the required minimum residual pressure line, addition or subtraction to shift the measurement error amounts to the side where the tank internal pressure becomes higher; and
at the tank temperature greater than or equal to the minimum temperature, the usage limit threshold value line is calculated using the tangent line for error adjustment.

12. A fuel cell vehicle comprising a residual pressure determination system for a high pressure tank having a resin liner configured to store a gas therein, and a reinforced layer covering an outer surface of the liner,
the residual pressure determination system comprising:
an internal pressure measurement unit configured to measure a tank internal pressure, which is a pressure of the gas inside the liner, to thereby obtain a measured internal pressure value;
a temperature measurement unit configured to measure a tank temperature, which is a temperature of the gas inside the liner, to thereby obtain a measured temperature value;
a storage unit configured to store a usage limit threshold value line which is a function of the tank temperature and is indicative of a usage limit threshold value of the tank internal pressure, the usage limit threshold value line being calculated using at least one of a required minimum residual pressure line which is a function of the tank temperature and is indicative of a required minimum value of the tank internal pressure, and an isopycnic line indicative of a relationship between the tank temperature and the tank internal pressure in which a density of the gas is maintained with the tank internal pressure being on the required minimum residual pressure line at a minimum temperature within an allowable temperature range that is an allowable range of an environmental temperature at which the high pressure tank is used; and
a computation unit configured to determine, as a corresponding usage limit threshold value, the tank internal pressure on the usage limit threshold value line corresponding to the measured temperature value; and
a determination unit configured to stop release of the gas from the high pressure tank when having determined that the measured internal pressure value has decreased to the corresponding usage limit threshold value,
wherein the tank internal pressure indicated by the usage limit threshold value line within the allowable temperature range becomes greater than or equal to the tank internal pressure indicated by the isopycnic line, in a case that an entirety of the tank internal pressure indicated by the required minimum residual pressure line within the allowable temperature range is less than or equal to the tank internal pressure indicated by the isopycnic line, and becomes greater than or equal to the tank internal pressure indicated by a tangent line obtained by moving the isopycnic line to a side where the tank internal pressure becomes higher so that the isopycnic line contacts the required minimum residual pressure line, in a case that at least a portion of the tank internal pressure indicated by the required minimum residual pressure line within the allowable temperature range exceeds the tank internal pressure indicated by the isopycnic line, and
at least a portion of the tank internal pressure indicated by the usage limit threshold value line within the allowable temperature range becomes lower as the tank temperature becomes lower.

13. The fuel cell vehicle according to claim 12, wherein:
in the residual pressure determination system, within the allowable temperature range, in a case that the entirety of the tank internal pressure indicated by the required minimum residual pressure line is less than or equal to the tank internal pressure indicated by the isopycnic line, and measurement error amounts of the internal pressure measurement unit and the temperature measurement unit are not adjusted,
at the tank temperature lower than the minimum temperature, the usage limit threshold value line is calculated using either one, for which the tank internal pressure is higher, of the required minimum residual pressure line and the isopycnic line; and
when the tank internal pressure on the isopycnic line corresponding to a maximum temperature within the allowable temperature range is indicated by a maximum temperature internal pressure line, at the tank temperature greater than or equal to the minimum temperature, the usage limit threshold value line is calculated using either one, for which the tank internal pressure is lower, of the maximum temperature internal pressure line and the isopycnic line.

14. The fuel cell vehicle according to claim 12, wherein:

in the residual pressure determination system, within the allowable temperature range, in a case that the entirety of the tank internal pressure indicated by the required minimum residual pressure line is less than or equal to the tank internal pressure indicated by the isopycnic line, and measurement error amounts of the internal pressure measurement unit and the temperature measurement unit are adjusted, at the tank temperature lower than the minimum temperature, the usage limit threshold value line is calculated using either one, for which the tank internal pressure is higher, of a required minimum residual pressure line for error adjustment and an isopycnic line for error adjustment respectively obtained by performing, on the required minimum residual pressure line and the isopycnic line, addition or subtraction to shift the measurement error amounts to the side where the tank internal pressure becomes higher; and when the tank internal pressure on the isopycnic line corresponding to a maximum temperature within the allowable temperature range is indicated by a maximum temperature internal pressure line, at the tank temperature greater than or equal to the minimum temperature, the usage limit threshold value line is calculated using either one, for which the tank internal pressure is lower, from among the one, for which the tank internal pressure is higher, of the required minimum residual pressure line for error adjustment and the isopycnic line for error adjustment, and a maximum temperature internal pressure line for error adjustment obtained by performing the addition or subtraction to the maximum temperature internal pressure line.

15. The fuel cell vehicle according to claim 12, wherein:

in the residual pressure determination system, within the allowable temperature range, in a case that at least a portion of the tank internal pressure indicated by the required minimum residual pressure line exceeds the tank internal pressure indicated by the isopycnic line, and measurement error amounts of the internal pressure measurement unit and the temperature measurement unit are not adjusted, at the tank temperature lower than the minimum temperature, the usage limit threshold value line is calculated using either one, for which the tank internal pressure is higher, of the tangent line and the required minimum residual pressure line; and at the tank temperature greater than or equal to the minimum temperature, the usage limit threshold value line is calculated using the tangent line.

16. The fuel cell vehicle according to claim 12, wherein:

in the residual pressure determination system, within the allowable temperature range, in a case that at least a portion of the tank internal pressure indicated by the required minimum residual pressure line exceeds the tank internal pressure indicated by the isopycnic line, and measurement error amounts of the internal pressure measurement unit and the temperature measurement unit are adjusted, at the tank temperature lower than the minimum temperature, the usage limit threshold value line is calculated using either one, for which the tank internal pressure is higher, of a tangent line for error adjustment and a required minimum residual pressure line for error adjustment respectively obtained by performing, on the tangent line and the required minimum residual pressure line, addition or subtraction to shift the measurement error amounts to the side where the tank internal pressure becomes higher; and at the tank temperature greater than or equal to the minimum temperature, the usage limit threshold value line is calculated using the tangent line for error adjustment.

17. The fuel cell vehicle according to claim 12, wherein, when having determined that the measured internal pressure value is less than or equal to the corresponding usage limit threshold value, the determination unit closes, by a main stop valve, a discharge flow passage for the gas of the high pressure tank.

* * * * *